(12) United States Patent
Zhou et al.

(10) Patent No.: US 9,235,308 B2
(45) Date of Patent: Jan. 12, 2016

(54) EMBEDDED TOUCH CONTROL DISPLAY DEVICE CONFIGURED TO MINIMIZE PARASITIC CAPACITANCE

(71) Applicants: Shanghai Tianma Micro-Electronics Co., Ltd., Shanghai (CN); Tianma Micro-Electronics Co., Ltd., Shenzhen (CN)

(72) Inventors: Xingyao Zhou, Shanghai (CN); Baoling Liu, Shanghai (CN); Jiaoyan Ren, Shanghai (CN); Jun Ma, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/420,347

(22) PCT Filed: Jul. 16, 2013

(86) PCT No.: PCT/CN2013/079474
§ 371 (c)(1),
(2) Date: Feb. 6, 2015

(87) PCT Pub. No.: WO2014/023152
PCT Pub. Date: Feb. 13, 2014

(65) Prior Publication Data
US 2015/0205406 A1    Jul. 23, 2015

(30) Foreign Application Priority Data
Aug. 8, 2012 (CN) ................... 2012 2 0391085 U

(51) Int. Cl.
G06F 3/044 (2006.01)
G06F 3/041 (2006.01)
G02F 1/1333 (2006.01)

(52) U.S. Cl.
CPC ............ *G06F 3/044* (2013.01); *G02F 1/13338* (2013.01); *G06F 3/0412* (2013.01); *G06F 2203/04107* (2013.01); *G06F 2203/04112* (2013.01)

(58) Field of Classification Search
CPC .................................................. G02F 1/13338
See application file for complete search history.

(56) References Cited

U.S. PATENT DOCUMENTS

| 2009/0159786 A1* | 6/2009 | Yang ...................... G06F 3/042 250/227.29 |
| 2010/0136868 A1* | 6/2010 | Chien .................... G06F 3/0412 445/24 |
| 2010/0265210 A1* | 10/2010 | Nakanishi ............... G06F 3/044 345/174 |
| 2011/0248944 A1* | 10/2011 | Liu .......................... G06F 3/046 345/173 |

FOREIGN PATENT DOCUMENTS

| CN | 102193230 A | 9/2011 |
| CN | 202142046 U | 2/2012 |
| CN | 102541334 A | 7/2012 |
| CN | 202795318 U | 3/2013 |

OTHER PUBLICATIONS

International Search Report for PCT Application No. PCT/CN2013/079474, mailed Oct. 24, 2013, 5 pages total.

\* cited by examiner

*Primary Examiner* — Ryan A Lubit
(74) *Attorney, Agent, or Firm* — Alston & Bird LLP

(57) ABSTRACT

An embedded touch control display device is disclosed. The embedded touch control display device includes a first substrate and a second substrate which are set oppositely; an in-plane switching (IPS) or fringe field switching (FFS) display mode display structure and a capacitance touch structure which are set between the first substrate and the second substrate, and the IPS or FFS display mode display structure is located on the first substrate and comprises a pixel electrode layer, a first medium layer, a public electrode layer and a crystal layer, and the capacitance touch structure is located on the second substrate and comprises touch electrode and a second medium layer; an planarization layer which is located between the second medium layer and the crystal layer; the distance between the touch electrode and the crystal layer is 4 micrometers to 7 micrometers.

12 Claims, 3 Drawing Sheets

EMBEDDED TOUCH CONTROL DISPLAY DEVICE CONFIGURED TO MINIMIZE PARASITIC CAPACITANCE

CROSS-REFERENCES TO RELATED APPLICATIONS

The present application is a national phase of International Application No. PCT/CN2013/079474, titled "EMBEDDED TOUCH CONTROL DISPLAY DEVICE", filed on Jul. 16, 2013, which claims the priority Chinese Patent Application No. 201220391085.7 entitled "EMBEDDED TOUCH DISPLAY DEVICE", filed on Aug. 8, 2012 with the State Intellectual Property Office of People's Republic of China, which are incorporated herein by reference in their entirety.

TECHNICAL FIELD

The disclosure relates to the liquid crystal display field, in particular to an embedded touch display device.

BACKGROUND OF THE INVENTION

Display devices commonly used in market are separate-type touch screens in which a touch panel and a liquid crystal panel are manufactured separately and then are assembled together. The display device manufactured in this way is relative thick and has significantly decreased transmittance and contrast since several layers of glass and film are introduced. In addition, the cost for the manufacture is high. To make the liquid crystal display device with a touch panel with smaller thickness, better display effect and more desirable cost, embedded touch technology is proposed, in which the touch panel and the liquid crystal panel are integrated, where the touch panel may use capacitive touch technology, resistive touch technology or infrared touch technology, etc., and a structure of the liquid crystal panel may be in a common twisted nematic liquid crystal (TN) mode, an in plane switching liquid crystal (IPS) mode or a fringe field switching liquid crystal (FFS) mode, etc. At present, the embedded touch technology mainly has two trends.

One is on-cell (outside liquid crystal cell) embedded touch display device, in which touch sensors are disposed between a color film substrate and a polarizer. Each liquid crystal panel and each touch assembly need to be assembled through lamination, and the final assembly cost depends on not only the cost of material but also yield of lamination process. Improving lamination yield and reducing number of times of lamination will be main stream in technology development of such touch panel.

The other is in-cell (inside liquid crystal cell) embedded touch display device, in which the touch sensors are embedded into liquid crystal pixels. For the in-cell embedded touch display device, touch sensing elements may be manufactured with a standard thin film transistor (TFT) liquid crystal display (LCD) process, and the lamination for the appearance and the alignment of mechanisms in the display device are avoided, resulted in lighter and thinner products with largely reduced weight and thickness, barely changed viewing angle, better transmittance for the panel and better image quality for the screen.

In general, the performance of existing in-cell (inside liquid crystal cell) embedded touch display device is unsatisfactory.

BRIEF SUMMARY OF THE INVENTION

The disclosure is to solve a problem of unsatisfactory performance of in-cell embedded touch display device.

To solve above problem, the disclosure provides an embedded touch display device, including:

a first substrate and a second substrate disposed opposite to the first substrate;

a display structure in an IPS or FFS display mode and a capacitive touch structure, where both of the display structure and the capacitive touch structure are located between the first substrate and the second substrate, the display structure in the IPS or FFS display mode is located on a front surface of the first substrate, and includes a pixel electrode layer, a first dielectric layer, a common electrode layer and a liquid crystal layer, and the capacitive touch structure is located on a front surface of the second substrate and includes a touch electrode and a second dielectric layer; and a planarization layer, located between the second dielectric layer and the liquid crystal layer, where a distance between the touch electrode and the liquid crystal layer is in a range of 4 µm~7 µm.

Optionally, the first substrate and the second substrate are transparent insulating substrates.

Optionally, the pixel electrode layer and the common electrode layer are transparent conductive layers.

Optionally, the common electrode layer includes multiple common electrodes arranged in parallel.

Optionally, the capacitive touch structure includes multiple sensing electrodes arranged in parallel and multiple drive electrodes arranged in parallel, and the sensing electrodes intersect with the drive electrodes;

each sensing electrode or each drive electrode includes a plurality of small partitioned electrode patterns, and the sensing electrodes and the drive electrodes are covered by a dielectric layer with via holes;

the electrode patterns of each sensing electrode are electrically connected together through wires and the drive electrodes are electrically connected together through wires passing through the via holes, or, the electrode patterns of each drive electrode are electrically connected together through wires and the sensing electrodes are electrically connected together through wires passing through the via holes.

Optionally, the drive electrodes and the sensing electrodes include an indium tin oxide layer and a metal layer overlapping with each other, where the metal layer has a net structure.

Optionally, the metal layer is covered by a protective layer.

Optionally, the second dielectric layer is color film having a dielectric constant of 3.5.

Optionally, the planarization layer is organic film having a dielectric constant of 3.5.

Optionally, an alignment layer is coated between the planarization layer and the liquid crystal layer, and the alignment layer is made of polyimide.

Optionally, a third dielectric layer is further included between the first substrate and the pixel electrode layer.

With the simple way of setting a distance between the touch electrode and the liquid crystal layer to a value with minimal affection exerted on parasitic capacitance caused by inversion of liquid crystal molecules according to the disclosure, a problem of inaccurate touch determination in a touch structure of an in-cell embedded touch display device with a liquid crystal structure in an IPS or FFS display mode due to change of the parasitic capacitance, is effectively solved.

DETAILED DESCRIPTION OF THE PREFERRED EMBODIMENTS

Figure 1:
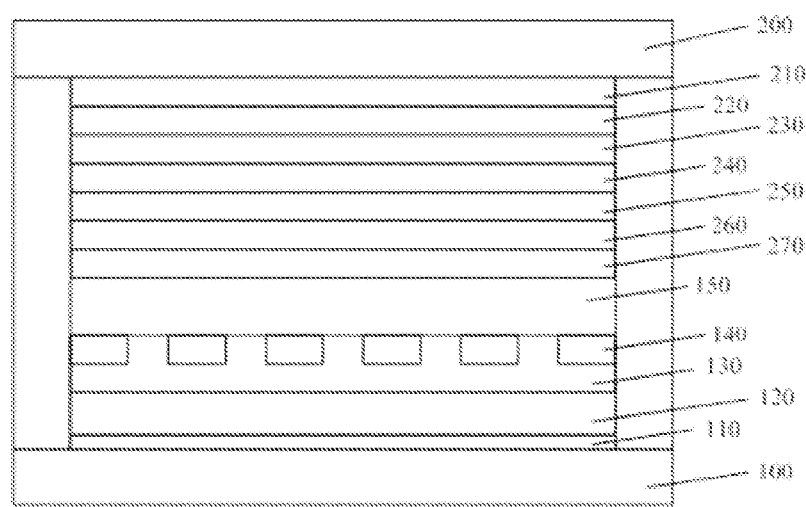
FIG. 1 is a schematic structural diagram of an embedded touch display device according to the disclosure.

In a capacitive in-cell embedded touch display device, a touch electrode (a drive electrode and a sensing electrode) of a capacitive touch panel is embedded between a color filter substrate and a polarizer. A structure of an embedded touch display device, as shown in FIG. 1, includes a first substrate 100 and a second substrate 200, where the first substrate 100 and the second substrate 200 are disposed opposite to each other, and each of the first substrate 100 and the second substrate 200 is a transparent insulating substrate, which may be a glass substrate commonly used in the liquid crystal manufacture field. A display structure in an IPS or FFS mode and a capacitive touch structure are disposed between the first substrate 100 and the second substrate 200. The display structure in the IPS or FFS mode is located on a front surface of the first substrate 100, and includes, from bottom to top, a pixel electrode layer 120, a first dielectric layer 130, a common electrode layer 140 and a liquid crystal layer 150. In practice, a third dielectric layer 110 is filled between the first substrate 100 and the pixel electrode layer 120, and the first dielectric layer 130 and the third dielectric layer 110 are made of organic film. The capacitive touch structure is located on a front surface of the second substrate 200, and includes a touch electrode and a second dielectric layer 260 disposed on the touch structure, where the touch electrode includes a protective layer 210, a metal layer 220, an indium tin oxide layer 230, an organic film layer 240 and a metal bridge layer 250 which are located beneath the second substrate 200. A planarization layer 270 for filling up the gap between the second dielectric layer 260 and the liquid crystal layer 150, is further included between the second dielectric layer 260 and the liquid crystal layer 150. The second dielectric layer 260 is a color film.

Specifically, in this embodiment, the IPS or FFS display mode is the FFS display mode, the display structure is located on the first substrate 100, and includes, from bottom to top, the third dielectric layer 110, the pixel electrode layer 120, the first dielectric layer 130, the common electrode layer 140 and the liquid crystal layer 150, in each pixel region. An alignment layer made of polyimide may be further coated between the planarization layer 270 and the liquid crystal layer 150. The alignment layer is not shown in FIG. 1 due to its extreme thin thickness. The pixel electrode layer 120 and the common electrode layer 140 are made of transparent conductive material, and the conductive material is indium tin oxide in this embodiment. The pixel electrode layer 120 is a layer of indium tin oxide, and the common electrode layer 140 includes multiple spaced common electrodes arranged in parallel. The common electrode layer 140 and the pixel electrode layer 120 may be in other positions and structures according to other embodiments. For example, the positions and structures of the common electrode layer 140 and the pixel electrode layer 120 are exchanged. Alternatively, the pixel electrode layer 120 includes multiple spaced electrodes arranged in parallel, which correspond to the common electrode 140, and the pixel electrode layer 120 is located on a side of the liquid crystal layer 150 which is opposite to the common electrode 140 (which is the IPS mode). The disclosure is not limited in this aspect.

Figure 2:
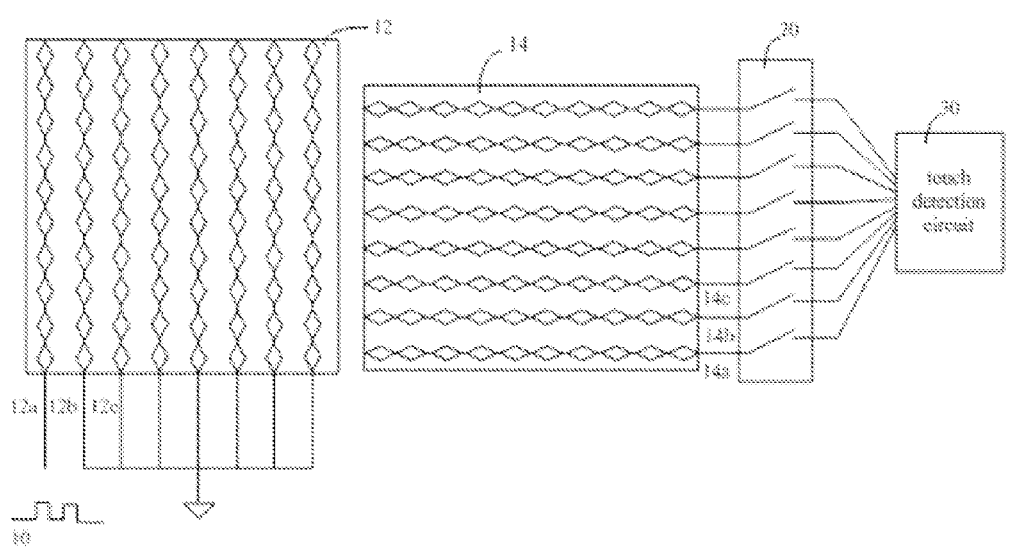
FIG. 2 is a top view of a capacitive touch structure according to an embodiment of the disclosure.

FIG. 2 shows a top view of the capacitive touch structure according to an embodiment. The capacitive touch structure includes a drive electrode layer 12 and a sensing electrode layer 14. Each of the drive electrode layer 12 and the sensing electrode layer 14 is formed by small electrode patterns each as a "diamond graph" in a way that the electrode patterns are connected with each other to form respective electrodes arranged in parallel. The drive electrode layer 12 includes multiple drive electrodes 12a, 12b, 12c . . . and the sensing electrode layer 14 includes multiple sensing electrodes 14a, 14b, 14c . . . .

According to the embodiment, the drive electrodes intersect with the sensing electrodes, and the "diamond graphs" of the drive electrodes are connected to each other in a same horizontal direction. The sensing electrodes and the drive electrodes are covered by a dielectric layer with via holes, and wires passing through the via holes electrically connect the "diamond graphs" of sensing electrodes with each other. Alternatively, the "diamond graphs" of the sensing electrodes are connected to each other in a same horizontal direction. The sensing electrodes and the drive electrodes are covered by a dielectric layer with via holes, and wires passing through the via holes electrically connect the "diamond graphs" of drive electrodes with each other.

The drive electrodes and the sensing electrodes include an indium tin oxide layer and a metal layer arranged in an overlapping manner, where the indium tin oxide layer forms the "diamond graphs", metal of the metal layer covers edges of each "diamond graph" to form a net structure, which functions to enhance overall conductive property of the touch electrode. The grids of the metal layer are further covered by a protective layer. Accordingly, the wires passing through the via holes to connect the sensing electrodes, the dielectric layer with via holes, the indium tin oxide layer and the metal layer of the drive electrodes and the sensing electrodes, and the protective layer respectively correspond to the metallic bridge layer, the first dielectric layer, the indium tin oxide layer, the metal layer and the protective layer shown in FIG. 1.

The touch electrode operates as follows: alternating drive voltage 10 is applied to the drive electrodes 12a, 12b, 12c . . . in sequence, and other drive electrodes are grounded; the sensing electrodes 14a, 14b, 14c . . . are connected to a touch detection circuit 30 through a gate switch 20 to detect touch signal. The scanning process is exemplified herein: applying the drive voltage 10 to the drive electrode 12a, and grounding other drive electrodes 12b, 12c . . . ; connecting the sensing electrode 14a to the touch detection circuit 30 via the gate switch 20, so that the drive electrode 12a and the sensing electrode 14a are under detection, and only when a finger touches an intersection point between the two electrodes, a touch signal is generated; then connecting the sensing electrodes 14b, 14c . . . to the touch detection circuit 30 via the gate switch 20 in sequence, and detecting touch signals at intersection points between the drive electrode 12a and the sensing electrodes 14b, 14c . . . in sequence; thereafter, applying the drive voltage 10 to the drive electrode 12b, grounding the drive electrodes 12a, 12c . . . ; and connecting the sensing electrodes 14a, 14b, 14c . . . to the touch detection circuit 30 via the gate switch 20 in sequence, so that drive electrodes 12a, 12b, 12c . . . are scanned in sequence to complete the scan process, and all interconnection points between all electrodes and all sensing electrode are scanned.

Figure 3:
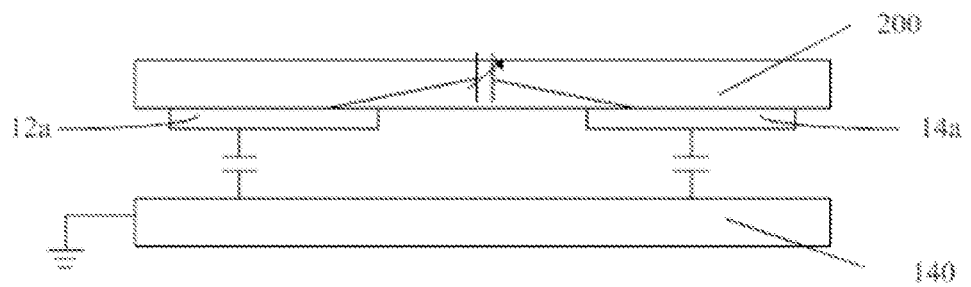
FIG. 3 is a schematic diagram of a part of an embedded touch display device at which parasitic capacitance is generated according to the disclosure.

The parasitic capacitances, generated between the drive and sensing electrodes in the touch screen and other display electrodes in the liquid crystal display structure, may seriously affect signal to noise ratio of the capacitive touch. According to the embodiment, a main parasitic capacitance exists between the touch electrode and the common electrode layer 140 in the liquid crystal layer or between the touch electrode and the pixel electrodes 120 closest to the touch electrode. Taking the drive electrode 12a and the sensing electrode 14a as an example, as shown in FIG. 3, the drive electrode 12a and the sensing electrode 14a are located on a surface of the second substrate 200, and there are parasitic capacitances between the drive electrode 12a and the common electrode layer 140, and between the sensing electrode 14a and the common electrode layer 140.

Figure 4:
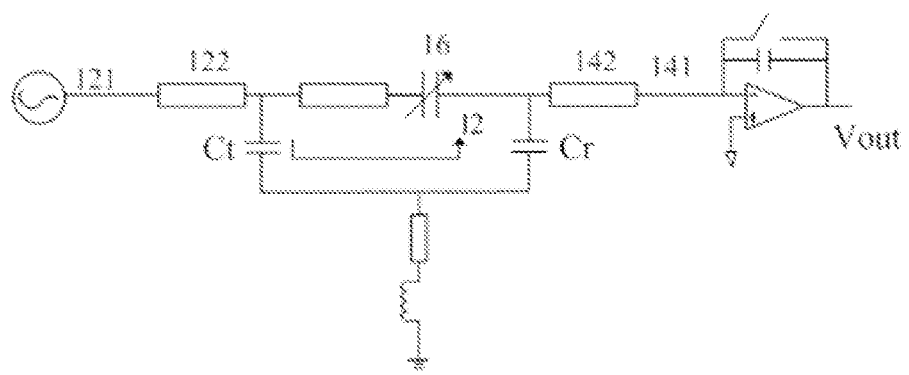
FIG. 4 is an equivalent circuit diagram of an embedded touch display device according to the disclosure.

FIG. 4 shows an equivalent circuit for intersection points between respective drive electrodes and sensing electrodes, where Ct represents parasitic capacitor between the drive electrode of the touch screen and other display electrodes in the liquid crystal display structure, and Cr represents parasitic capacitor between the sensing electrode of the touch screen and the other display electrodes in the liquid crystal display structure. The drive electrode is equivalent to a drive line 121 and a resistor 122, the sensing electrode is equivalent to a sensing line 141 and a resistor 142, a mutual capacitor 16 is generated at each intersection point between the drive electrodes and the sensing electrodes, the parasitic capacitor Ct is generated between the drive electrode and the ground, the parasitic capacitor Cr is generated between the sensing electrode and the ground, and the touch detection circuit 30 is a charge amplifier converting current on the sensing electrode into voltage signal Vout and outputting the voltage signal Vout. When a finger touches a touch panel, the mutual capacitance 16 at the touched position changes, thereby causing a change of an output current I on the sensing electrode and in turn a change of the output voltage Vout.

When the liquid crystal display structure displays images, liquid crystal molecules inverse differently due to different voltages, and dielectric constant of the liquid crystal layer changes as the drive voltage changes, resulting in different parasitic capacitances Ct and Cr when different images are displayed, causing a change of the output current I on the sensing electrode and in turn a change of the output voltage Vout, and therefore affecting sensing performance of the touch electrode in the touch screen.

Figure 5:
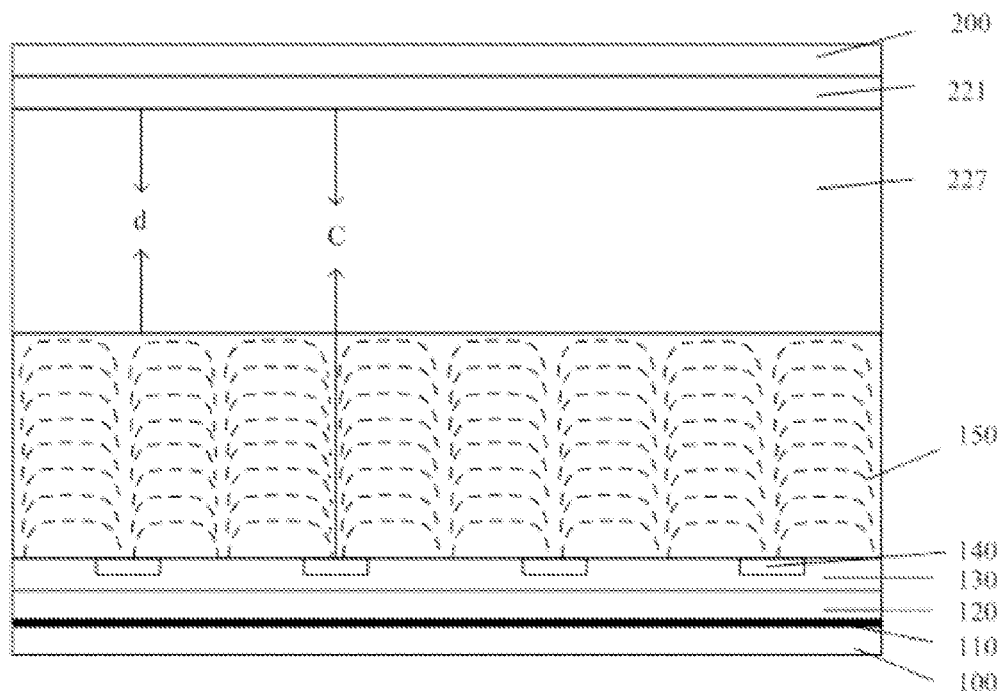
FIG. 5 is a schematic diagram of a simulation of an embedded touch display device according to the disclosure.

To reduce affection to the parasitic capacitance which is caused by the inversion of liquid crystal molecules, the inventors turn to two-dimensional (2D) simulation software (Dimos optical simulation software) for solution. FIG. 5 shows a model established through the simulation. The model includes a touch structure 221 and a liquid crystal display structure which are located between a first substrate 100 and a second substrate 200 disposed opposite to each other, and an organic dielectric layer 227 between the touch structure 221 and the liquid crystal display structure. The touch structure 221 illustrated as one layer in FIG. 5 includes the touch structure shown in FIG. 1, which includes a protective layer 210, a metal layer 220, an indium tin oxide layer 230, an organic film layer 240 and a metal bridge layer 250 all located on the second substrate 200. The organic dielectric layer 227 illustrated as one layer in FIG. 5 includes a second dielectric layer 260 and a planarization layer 270 in FIG. 1. The protective layer is a black matrix layer configured to shield the metal layer, TFTs and wirings, for purpose of preventing light leakage. The second dielectric layer is a color film, and the planarization layer is an organic film. An alignment layer (not shown in FIG. 5), made of polyimide commonly used in liquid crystal manufacture field, is disposed between the planarization layer and the liquid crystal layer. Preferably, the planarization layer is made of ester polymers, which are organic materials with a dielectric constant of 3.5. In FIG. 5, the model also includes a liquid crystal layer 150. The common electrode 140 is disposed beneath the liquid crystal layer 150, a first insulating dielectric layer 130 is disposed beneath the common electrode 140, and a pixel electrode layer 120 and a third dielectric layer 110 are disposed beneath the first dielectric layer 130 in sequence. The first dielectric layer 130 and the third dielectric layer 110 are insulating organic films. In this model, the common electrode 140 is closer to the touch structure 221, i.e., a parasitic capacitance needing to be measured is a capacitance C between the touch structure 221 and the common electrode 140. Through simulation for the structure of the embedded touch display device, the inventors find that a thickness of the organic dielectric layer 227, i.e., a distance d between the touch electrode and the liquid crystal layer, specifically a distance d from the touch electrode to an interface between the liquid crystal layer and the second dielectric layer, is a key factor, and in certain distance ranges, inversion of liquid crystal molecules have smaller affection on capacitance. Parameters are set as follows, and it should be noted that the affection of the alignment layer to d is considered as negligible since a thickness of the alignment layer is extreme thin.

Under a same drive voltage, changes in parasitic capacitances Ct and Cr are consistent, therefore the parasitic capacitances Ct and Cr are collectively referred as C, and the variation is ΔC under a certain drive voltage. A voltage on the common electrode is set as 0V, a black state voltage and a white state voltage are selected as voltages of the pixel electrode to perform simulation, where the black state is a low voltage, the value of which is taken as 0.1V, and the white voltage is a high voltage which generally has a value in a range of 4.5V-5.5V since the voltage in case of maximum brightness (white state voltage) varies slightly in different com designs. A thickness of the liquid crystal layer 150 is set as 3.5 μm. Multiple simulations are performed regarding the change of capacitance in case of different distances according to different line width ratios. In a case that the line width ratios of the common electrode layer 140 are 2.5/4.5, 2.9/4.1 and 2.0/5.0 respectively, table 1, table 2 and table 3 are respectively acquired in the following.

TABLE 1 change of capacitance C with the distance d in a case that line width ratio of the common electrode is 2.5/4.5

| organic film d/μm | 1 V capacitance C (F/m) | 5 V capacitance C (F/m) | capacitance change rate ΔC |
| --- | --- | --- | --- |
| 0 | 1.93E−10 | 2.50E−10 | 29.74% |
| 1 | 1.53E−10 | 1.65E−10 | 7.99% |
| 2 | 1.28E−10 | 1.30E−10 | 1.75% |
| 3 | 1.11E−10 | 1.12E−10 | 1.55% |
| 3.5 | 1.04E−10 | 1.04E−10 | 0.92% |
| 4 | 9.66E−11 | 9.73E−11 | 0.68% |
| 4.5 | 9.15E−11 | 9.20E−11 | 0.55% |
| 5 | 8.70E−11 | 8.75E−11 | 0.62% |
| 5.5 | 8.24E−11 | 8.28E−11 | 0.45% |
| 6 | 7.78E−11 | 7.81E−11 | 0.32% |
| 6.5 | 7.43E−11 | 7.48E−11 | 0.62% |
| 7 | 7.14E−11 | 7.20E−11 | 0.94% |
| 7.5 | 6.83E−11 | 6.90E−11 | 1.09% |
| 8 | 6.59E−11 | 6.66E−11 | 1.05% |
| 9 | 6.12E−11 | 6.20E−11 | 1.34% |
| 10 | 5.70E−11 | 5.78E−11 | 1.41% |
| 11 | 5.36E−11 | 5.48E−11 | 2.27% |

TABLE 2 change of capacitance C with the distance d in a case that line width ratio of the common electrode is 2.9/4.1

| organic film d/um | 1 V capacitance C (F/m) | 5 V capacitance C (F/m) | capacitance change rate ΔC |
|---|---|---|---|
| 0 | 2.13E-10 | 2.78E-10 | 30.52% |
| 1 | 1.69E-10 | 1.83E-10 | 8.29% |
| 2 | 1.54E-10 | 1.62E-10 | 5.34% |
| 3 | 1.21E-10 | 1.24E-10 | 2.18% |
| 3.5 | 1.13E-10 | 1.14E-10 | 0.81% |
| 4 | 1.07E-10 | 1.07E-10 | 0.74% |
| 4.5 | 1.00E-10 | 1.00E-10 | 0.33% |
| 5 | 9.48E-11 | 9.51E-11 | 0.27% |
| 5.5 | 8.99E-11 | 9.02E-11 | 0.34% |
| 6 | 8.55E-11 | 8.58E-11 | 0.39% |
| 6.5 | 8.16E-11 | 8.22E-11 | 0.71% |
| 7 | 7.81E-11 | 7.85E-11 | 0.60% |
| 7.5 | 7.50E-11 | 7.56E-11 | 0.78% |
| 8 | 7.21E-11 | 7.27E-11 | 0.88% |
| 9 | 6.72E-11 | 6.79E-11 | 0.99% |
| 10 | 6.21E-11 | 6.29E-11 | 1.21% |
| 11 | 5.84E-11 | 5.93E-11 | 1.56% |

TABLE 3 change of capacitance C with the distance d in a case that line width ratio of the common electrode is 2.0/5.0

| organic film d/um | 1 V capacitance C (F/m) | 5 V capacitance C (F/m) | capacitance change rate ΔC |
|---|---|---|---|
| 2 | 1.12E-10 | 1.16E-10 | 4.16% |
| 3 | 9.61E-11 | 9.86E-11 | 2.60% |
| 3.5 | 8.99E-11 | 9.13E-11 | 1.57% |
| 4 | 8.43E-11 | 8.48E-11 | 0.59% |
| 4.5 | 7.99E-11 | 8.02E-11 | 0.40% |
| 5 | 7.56E-11 | 7.59E-11 | 0.41% |
| 5.5 | 7.18E-11 | 7.21E-11 | 0.53% |
| 6 | 6.84E-11 | 6.89E-11 | 0.78% |
| 6.5 | 6.54E-11 | 6.62E-11 | 1.25% |
| 7 | 6.25E-11 | 6.34E-11 | 1.48% |
| 7.5 | 6.00E-11 | 6.11E-11 | 1.80% |
| 9 | 5.36E-11 | 5.50E-11 | 2.68% |
| 11 | 4.69E-11 | 4.83E-11 | 3.07% |

Figure 6:
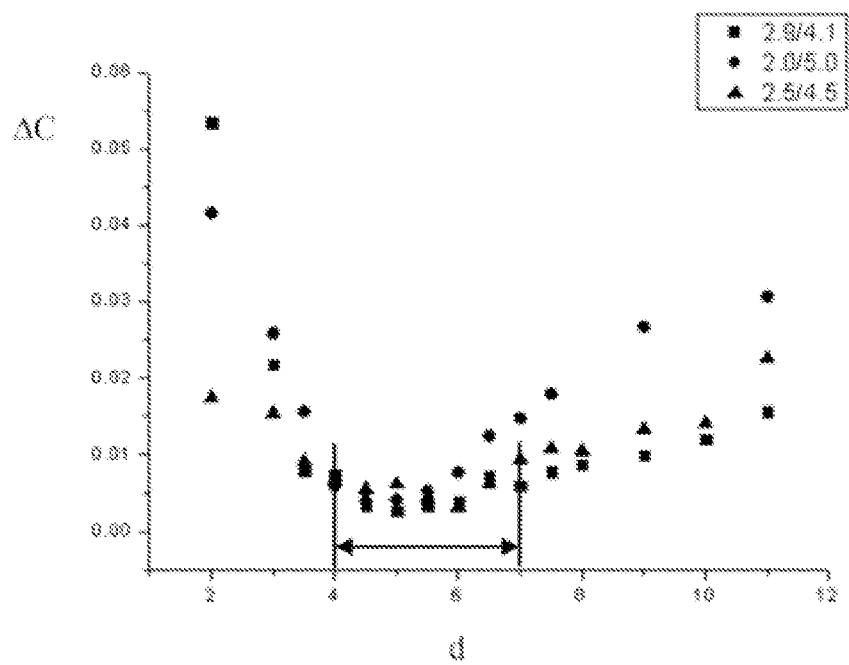
FIG. 6 is a diagram of d-AC curves for an embedded touch display device according to the disclosure.

A d-ΔC coordinated system is established, where the abscissa represents a thickness d of the organic layer in unit of μm, and the ordinate represents variance ΔC of capacitance C in unit of F/m under voltages of 1 v and 5 v. Values of ΔC in case of different values of d are depicted in the d-AC coordinated system, and a curve diagram as in FIG. 6, is acquired. The curve indicates an optimized range of d (4 um-7 um) in which ΔC changes smoothly. Therefore selecting the optimized range of d (4 um-7 um) may effectively reduce affection exerted on the charge reading by the change of parasitic capacitance. Other situation is similar.

To make the purpose, features and merits more apparently and understandably, the embodiments of the disclosure are described in detail in the following in conjunction with drawings.

To facilitate the sufficient understanding of the disclosure, many details are set forth in the following description. However, the present disclosure can be implemented in other manners than those described herein, and similar extensions can be made by those skilled in the art without deviating from the spirit of the present disclosure. Therefore the present disclosure is not limited to the embodiments disclosed hereinafter.

The disclosure relates to an embedded touch display device, including a first substrate and a second substrate disposed opposite to the first substrate, a display structure in an IPS or FFS display mode and a capacitive touch structure, both of which are located between the first substrate and the second substrate. A structure and a position of the display structure in the IPS or FFS display mode are the same as that of the display structure in the foregoing IPS or FFS display mode. The display structure is located on a front surface of the first substrate, and includes a pixel electrode layer, a first dielectric layer, a common electrode layer and a liquid crystal layer, where the liquid has a thickness of 3.5 μm. The capacitive touch structure is the foregoing capacitive touch structure, which is located on a front surface of the second substrate, and includes a touch electrode and a second dielectric layer, and a planarization layer located between the second dielectric layer and the liquid crystal layer, where a distance from the touch electrode to an interface between the liquid crystal layer and the second dielectric layer is in a range of 4 μm~7 μm. A thickness of the liquid crystal layer is 3.5 μm, the first and the second substrates are made of transparent glass, the first dielectric layer, the second dielectric layer and the planarization layer are transparent insulating organic films, where the second dielectric layer is a color film, and the second dielectric layer and the planarization layer has a dielectric constant of 3.5.

In this way, with the simple way of setting a distance between the touch electrode and the liquid crystal layer to a value with minimal affection exerted on parasitic capacitance caused by inversion of liquid crystal molecules according to the disclosure, a problem of inaccurate touch determination in a touch structure of an in-cell embedded touch display device with a liquid crystal structure in an IPS or FFS display mode due to change of the parasitic capacitance, is effectively solved.

The foregoing are only preferred embodiments of the disclosure, and are not meant to formally limit the disclosure.

Although the disclosure is disclosed in preferred embodiments as mentioned above, the preferred embodiments are not meant to restrict the disclosure. Numerous modifications, variations and equivalent alternatives can be made by those skilled in the art based on the above disclosed method and technical contents without departing from the scope of the technical solutions. Therefore, any content that does not deviate from the technical solutions of the present disclosure, and any simple variations, equivalents and modifications made to the above embodiments based on the essence of the present disclosure fall in the scope of the present disclosure.

What is claimed is:

1. An embedded touch display device, comprising:
   a first substrate;
   a second substrate disposed opposite to the first substrate;
   a display structure in an IPS (in-plane-switching) or FFS (fringe field switching) modes;
   a capacitive touch structure, wherein both the display structure and the capacitive touch structure are located between the first substrate and the second substrate, wherein the display structure is located on a surface of the first substrate facing the second substrate, and wherein the display structure comprises:
   a pixel electrode layer,
   a first dielectric layer,
   a common electrode layer,
   a liquid crystal layer,
   wherein the capacitive touch structure is located on a surface of the second substrate facing the first substrate and comprises a touch electrode and a second dielectric layer located on the touch electrode; and a planarization layer located between the second dielectric layer and the liquid crystal layer,
wherein a distance between the touch electrode and the liquid crystal layer is in a range of 4 μm~7 μm to minimize parasitic capacitance.

2. The embedded touch display device according to claim 1, wherein the first substrate and the second substrate are transparent insulating substrates.

3. The embedded touch display device according to claim 1, wherein the pixel electrode layer and the common electrode layer are transparent conductive layers.

4. The embedded touch display device according to claim 1, wherein the common electrode layer comprises a plurality of common electrodes arranged in parallel.

5. The embedded touch display device according to claim 1, wherein the capacitive touch structure comprises a plurality of sensing electrodes arranged in parallel and a plurality of drive electrodes arranged in parallel, and the sensing electrodes are substantially perpendicular to the drive electrodes,
wherein each sensing electrode or each drive electrode comprises a plurality of small partitioned electrode patterns, and
wherein the electrode patterns of each sensing electrode are electrically connected together through wires and the drive electrodes are electrically connected together through wires.

6. The embedded touch display device according to claim 5, wherein the drive electrodes and the sensing electrodes comprise an indium tin oxide layer and a metal layer overlapping with each other, and the metal layer has a net structure.

7. The embedded touch display device according claim 6, wherein the metal layer is covered by a protective layer.

8. The embedded touch display device according to claim 1, wherein the second dielectric layer is a color film having a dielectric constant of 3.5.

9. The embedded touch display device according to claim 1, wherein the planarization layer is an organic film having a dielectric constant of 3.5.

10. The embedded touch display device according to claim 1, wherein an alignment layer is coated between the planarization layer and the liquid crystal layer, and the alignment layer is a polyimide layer.

11. The embedded touch display device according to claim 1, further comprising a third dielectric layer disposed between the first substrate and the pixel electrode layer.

12. The embedded touch display device according to claim 1, wherein the liquid crystal layer has a thickness of 3.5 μm.

* * * * *